United States Patent [19]

Wikström

[11] 4,417,324

[45] Nov. 22, 1983

[54] MAGNETO-OPTIC TRANSDUCER

[75] Inventor: Bo B. Wikström, Malmö, Sweden

[73] Assignee: SAB Industri AB, Landskrona, Sweden

[21] Appl. No.: 260,757

[22] Filed: May 5, 1981

[30] Foreign Application Priority Data

May 14, 1980 [SE] Sweden ................................ 8003639

[51] Int. Cl.³ ........................ G11C 19/08; G11C 13/06
[52] U.S. Cl. ..................................................... 365/10
[58] Field of Search ........................ 365/10, 27, 28, 122

[56] References Cited

U.S. PATENT DOCUMENTS

| | | | |
|---|---|---|---|
| 3,515,456 | 6/1970 | Tabor | 365/10 |
| 3,602,911 | 8/1971 | Kurtzig | 365/28 |
| 3,831,156 | 8/1974 | Myer | 365/10 |
| 3,859,643 | 1/1975 | Borrelli | 365/10 |
| 4,123,783 | 10/1978 | Pearson et al. | 365/10 |

OTHER PUBLICATIONS

"Magnetic Bubble Technology: Integrated-Circuit Magnetics for Digital Storage and Processing" by Hsu Chang, Jun. 2, 1970, Chapter 2 (pp. 40–41), and Chapter 5 (pp. 167, 171, 175, 182–186).

Primary Examiner—James W. Moffitt
Attorney, Agent, or Firm—Laurence R. Brown

[57] ABSTRACT

A magnetic to optic transducer based upon magnetic bubble technology is provided. A magnetic sheet with a thin magnetic film guide pattern creating a bubble path thereon responds to external magnetic fields to position magnetic bubbles along the path. A varying magnetic field in the plane of the sheet displaces bubbles which are optically sensed by a fiber light conductor contacting both sides of the magnetic sheet at a location in the bubble path. A polarized light source transmits light through the fiber and a polarizing filter on one side of the magnetic sheet to a light detector on the other side of the sheet. The presence or absence of the magnetic bubble at the fiber position thereby affects the polarization of the light transmitted through the sheet and provides a detectable signal for reading the nature of the external magnetic field. The transducer may comprise permanent magnetic field generating means which do not require continuous energization.

3 Claims, 2 Drawing Figures

MAGNETO-OPTIC TRANSDUCER

TECHNICAL FIELD

This invention relates to a magneto-optic transducer.

BACKGROUND ART

In the construction of electronic systems to be used in the industry, in vehicles, etc., problems are often encountered as to the choice of a suitable transducer. It is common to provide the electronic systems with transducers which are connected to the electronic system over electrical conductors. This arrangement may cause problems because the long conductors connecting the transducers are exposed to disturbances from the surroundings. The problems thus encountered sometimes cannot be overcome for economical reasons.

However, other facilities have been developed recently for signal transmission, viz. the optic fiber. The cost of the optic fiber has developed in a favourable direction so that it can be expected that the metallic conductor in many cases will soon be uneconomical for signal transmission purposes. Therefore, the optic fiber will probably take over in a majority of the electronic control systems in a few years. The optic fiber which is completely insusceptible to disturbances and has a considerably lower weight than a metallic conductor, additionally has a transmission capacity which is several powers higher than that of the metallic conductor. A drawback of the transmission systems including optic fibers is that the transducers available at present for cooperation with the optic fiber system require an intermediary electronic system and such electronic system also must be provided at the receiver end. The electronic system requires a power supply and as a consequence thereof the optic fiber transmission system nevertheless will be susceptible to disturbances introduced via the power supply. The development as far as the transducers are concerned in fact has not kept pace with the rapid development of the electronics in general.

DISCLOSURE OF INVENTION

The purpose of the invention is to provide a transducer which makes possible to transmit signals optically without an intermediary electronic system between the transducer and the optic fiber, and for this purpose the invention provides a magneto-optic transducer based on the magnetic bubble technology.

According to the invention, the magneto-optic transducer is characterized by a thin planar sheet of magnetic material, means for producing a first magnetic field substantially perpendicular to said sheet, generating magnetic bubbles therein, a pattern of thin magnetic film applied to the surface of said sheet and defining a guide path for the magnetic bubbles, means for producing a second magnetic field in the plane of said sheet for moving the magnetic bubbles along said guide path, and means for optically sensing the presence of the magnetic bubbles at least at one location in said path.

This magneto-optic transducer has no moving elements. The operation thereof is based on the position of the easily moving magnetic bubbles being changed, and this means that the transducer according to the invention is quick-operating. Since the magnetic bubbles are able to rotate the polarization plane of the light, the magnetic bubbles can cooperate directly with the optic fiber transmission system; intermediary electronic adapter systems can be dispensed with. The transducer can operate without a power supply because the magnetic fields can be produced by means of permanent magnets and accordingly the transducer can be used in spaces having an explosive atmosphere.

Preferably, the optically sensing means comprise an optic fiber and a polarizing filter for supplying polarized light to the location wherein the presence of the magnetic bubbles is to be sensed, and a detector for detecting the light conditions at said location to indicate the presence of the magnetic bubbles therein.

It is also preferred that the sheet of magnetic material comprises a monocrystalline orthoferritic material and that the thin magnetic film applied to the surface thereof comprises a permalloy material.

BRIEF DESCRIPTION OF THE DRAWING

Embodiments of the invention will be described in more detail below, reference being made to the accompanying drawing in which.

DESCRIPTION OF THE PREFERRED EMBODIMENTS

Figure 1:
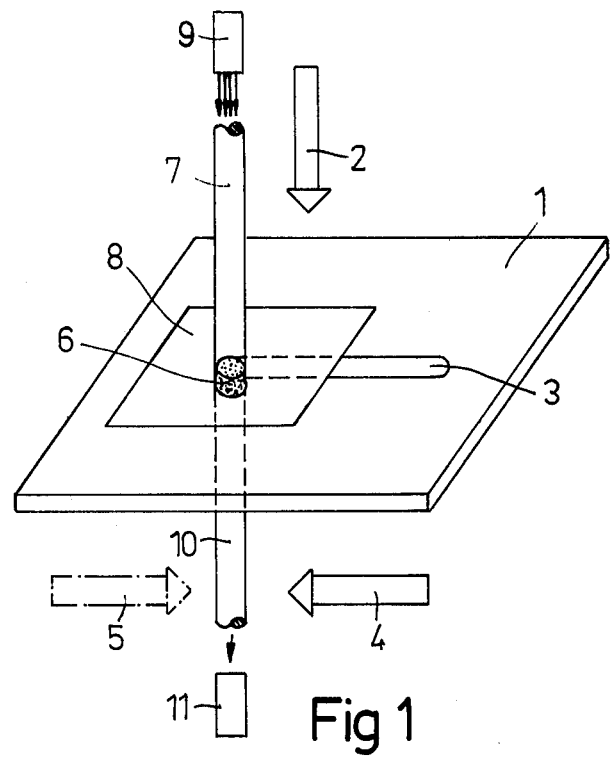
FIG. 1 is a diagrammatic perspective view of a transducer according to the invention.

The transducer disclosed in FIG. 1 comprises a thin planar magnetic sheet 1 of a magnetic material such as a monocrystalline orthoferrite having the formula $RFeO_3$ wherein R can be yttrium or another rare earth metal. Other suitable magnetic materials are garnet, hexagonal ferrite, manganese bismuth, and cobalt. Means such as a permanent magnet is provided for producing a static magnetic field indicated by an arrow 2, which is perpendicular to the surface of the sheet 1. This magnetic field should be of a strength generating magnetic bubbles in the sheet 1, and a suitable size of such bubbles is 25 to 200 $\mu$m. On the surface of the sheet 1 a thin permalloy layer 3 is applied to form a guide path for the magnetic bubbles. The layer 3 may also be of nickel or iron. The magnetic bubbles in the sheet 1 are very easily movable therein and can be displaced at a rate of up to one million steps per second. The power necessary for such displacement is of the order of 0.01 picojoule. For the displacement of the magnetic bubbles means are provided for producing a varying magnetic field in the plane of the sheet and this field too can be produced by means of a permanent magnet mounted to an element the position of which shall be indicated by means of the transducer. This magnetic field is indicated by an arrow 4. Means also comprising a permanent magnet can be provided for producing a constant magnetic field in the plane of the sheet 1 which is directed in opposite direction to the magnetic field 4 as indicated by a dot and dash line arrow 5 so that the field 4 must pass a predetermined threshold value before actuating the magnetic bubbles.

In FIG. 1 a single magnetic bubble is indicated at 6 and it is located at one end of the rectilinear guide path defined by the permalloy layer 3 under the influence of the magnetic field 4. If this field is removed the magnetic bubble 6 will be displaced to the right end of the permalloy guide path 3 under the influence of the magnetic field 5 or such displacement may be brought about by reversing the magnetic field 4 if no field 5 is applied.

It is well-known in the art that a magnetic bubble has the property of rotating the polarization plane of light directed towards the magnetic bubble, and this property of the magnetic bubble is utilized in the magneto-optic transducer of the invention for indicating the presence of the magnetic bubble at a predetermined location in the guide path defined by the permalloy layer 3. In the embodiment disclosed herein the presence of the magnetic bubble at the left end of the guide path is indicated. For this purpose an optic fiber 7 connects to the sheet 1 at one side thereof via a polarization filter 8 at the left end of the permalloy guide path 3. A light source 9 transmits light through the optic fiber 7. An optic fiber 10 connects to the sheet 1 at the other side thereof coaxially with the optic fiber 7 to transmit light to a detector 11. Thus, light emitted from the light source 9 and transmitted through the optic fiber 7 will be transmitted to the detector 11 through the optic fiber 10. Displacement of the magnetic bubble 6 to and from the location shown in FIG. 1 will provide a strong change of the light intensity detected by the detector 11. In the embodiment shown, said change is detected by means of the transmission of light through the magnetic sheet 1 but such detection can also be performed by means of the reflection of light from the sheet, which is also changed when the magnetic bubble 6 moves to and from the location shown in FIG. 1. If one or the other of these methods is to be used depends on the distance over which the optic signal is to be transmitted, the optic fiber quality, etc.

Figure 2:
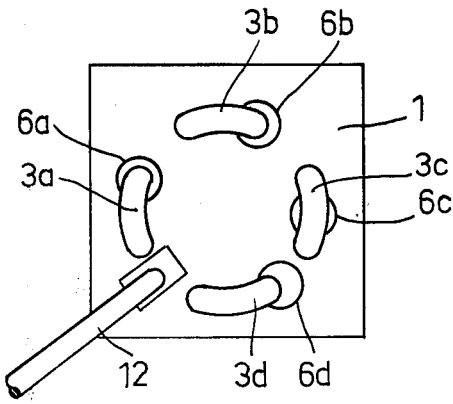
FIG. 2 is a diagrammatic plan view of a transducer according to the invention constructed as a transducer for indicating angular positions.

The transducer described no doubt can be utilized in a wide field of applications, e.g. as a rotational speed transducer, a position transducer, a pressure transducer, or an acoustic transducer. The permalloy guide path 3 can form different patterns depending on the desired function of the magneto-optic transducer. FIG. 2 discloses one pattern thereof used for indicating rotational speed.

Referring to FIG. 2, there is applied to one surface of the sheet 1 four curved permalloy layers 3a, 3b, 3c, and 3d extending over equal parts of a circle and being equally spaced. A magnetic field is produced also in this case perpendicularly to the plane of the sheet 1 to generate magnetic bubbles in said sheet, four magnetic bubbles 6a, 6b, 6c and 6d being shown in FIG. 2. When a rotating magnetic field is applied in the plane of the sheet 1 the magnetic bubble located under the permalloy layer disposed in the direction of the magnetic flow will jump from one permalloy layer to the other. Since the magnetic bubbles repell each other, a chain reaction will be initiated so that the magnetic bubbles will advance one step in the circular path. This procedure will be repeated four times (or generally n times if n permalloy layers are provided) when the magnetic field rotates over one revolution. The displacement of the magnetic bubbles can be detected by the arrangement disclosed in FIG. 1, such arrangement being generally indicated at 12 in FIG. 2.

The magneto-optic transducer disclosed herein is expected to increase the versatility of electronic systems in severe environments by providing an accurate and reliable indication without the necessity of a power supply being provided for the transducer. By choosing a suitable optic fiber and a suitable light source the transducer may be located up to several hundred or thousand meters from the electronic system controlled by the transducer.

Single bubbles 6 and 6a to 6d are shown herein but it will be understood that these bubbles may comprise a group or cluster of several individual bubbles.

I claim:

1. A magneto-optic transducer, comprising in combination, a thin planar sheet of magnetic material, means for producing a first magnetic field substantially perpendicular to said sheet, generating magnetic bubbles therein, a pattern of thin magnetic film applied to the surface of said sheet and defining a guide path for the magnetic bubbles, means for producing a second magnetic field in the plane of said sheet for moving the magnetic bubbles along said guide path, means for optically sensing the presence of the magnetic bubbles at least at one location in said path, characterized in that said second magnetic field comprises a constant component field and a variable component field in opposite direction to said constant component field.

2. A transducer for detecting displacement of magnetic bubbles by a varying magnetic field characterized in that the transducer is operable in locations with explosive atmospheres and the like and does not require a localized power source at the transducer location which must be energized and is subject to introduce errors in sensing and in that the transducer is disposed between and optically links together two optical conveyance fibers respectively for transmitting polarized light to the transducer and away from it, said transducer operable to modulate the polarization of the light transmitted through the fibers in response to bubble positions induced by said varying magnetic field and said transducer consisting of a thin planar sheet providing a magnetic bubble domain into which said fibers are abutted on opposite sides, means for generating a magnetic bubble in said sheet, and guide path means thereon for said moving magnetic bubble in said sheet over a path interposed between the two fibers in response to presence or absence of an external varying magnetic field signal disposed for influencing the movement of the bubble position between the two fibers.

3. The transducer of claim 2 including internal magnetic field means biasing said bubble in said path to assume a position that need be overcome by said external magnetic field to influence the movement of the bubble position between the two fibers.

* * * * *